(12) United States Patent
Schwindaman (10) Patent No.: US 12,257,985 B2
(45) Date of Patent: Mar. 25, 2025

(54) MODULAR LEVELING ASSEMBLY FOR VEHICLE

(71) Applicant: Schwintek Inc., Cassopolis, MI (US)

(72) Inventor: Michael Schwindaman, Cassopolis, MI (US)

(73) Assignee: Schwintek Inc., Cassopolis, MI (US)

( * ) Notice: Subject to any disclaimer, the term of this patent is extended or adjusted under 35 U.S.C. 154(b) by 259 days.

(21) Appl. No.: 17/654,925

(22) Filed: Mar. 15, 2022

(65) Prior Publication Data

US 2022/0306052 A1    Sep. 29, 2022

Related U.S. Application Data

(60) Provisional application No. 63/166,639, filed on Mar. 26, 2021.

(51) Int. Cl.
*B60S 9/12* (2006.01)
(52) U.S. Cl.
CPC ....................................... *B60S 9/12* (2013.01)
(58) Field of Classification Search
CPC ...... B60S 9/12; B60S 9/10; B60S 9/02; B66F 3/24
See application file for complete search history.

(56) References Cited

U.S. PATENT DOCUMENTS

| 7,296,779 | B2 * | 11/2007 | Bakshi | A47B 91/026 |
| | | | | 248/677 |
| 9,073,516 | B2 * | 7/2015 | Schwindaman | B60S 9/12 |
| 11,220,414 | B2 * | 1/2022 | Nylander | B60S 9/12 |
| 2015/0240805 | A1 * | 8/2015 | Hall | F04C 2/084 |
| | | | | 418/215 |

FOREIGN PATENT DOCUMENTS

FR    2718093 A1 * 10/1995 ........... B62B 3/0618

* cited by examiner

*Primary Examiner* — Seahee Hong
(74) *Attorney, Agent, or Firm* — Price Heneveld LLP (57) ABSTRACT

A modular leveling assembly for a vehicle includes a mounting bracket configured to mount to a vehicle component, a hydraulic cylinder assembly, including an inner piston rod member fixed with respect to the mounting bracket, and a first outer cylinder receiving the inner piston rod member therein, wherein the first outer cylinder is telescopingly moveable with respect to the inner piston rod member from a retracted position and an extended position, a support member coupled to a distal end of the first outer cylinder and configured to abut a ground surface when the first outer cylinder member is in the extended position, and a hydraulic pump assembly supported by the mounting bracket and hydraulically coupled to the cylinder assembly.

20 Claims, 7 Drawing Sheets

MODULAR LEVELING ASSEMBLY FOR VEHICLE

CROSS-REFERENCE TO RELATED APPLICATION

This application claims benefit to U.S. Provisional Patent Application No. 63/166,639, filed Mar. 26, 2021, entitled "MODULAR LEVELING ASSEMBLY FOR VEHICLE," the entire disclosure of which is incorporated herein.

BACKGROUND OF THE INVENTION

The embodiments as disclosed herein relate to a leveling assembly for a vehicle, and in particular to a modular leveling assembly for a vehicle that provides significant versatility for various mounting configurations and load requirements.

BRIEF SUMMARY OF THE INVENTION

One aspect of the embodiments disclosed herein includes a modular leveling assembly for a vehicle that includes a mounting bracket configured to mount to a vehicle component, and a hydraulic cylinder assembly including an inner piston rod member fixed with respect to the mounting bracket, and a first outer cylinder receiving the inner piston rod member therein, wherein the first outer cylinder is telescopingly moveable with respect to the inner piston rod member from a retracted position and an extended position. The modular leveling assembly further includes a support member coupled to a distal end of the first outer cylinder and configured to abut a ground surface when the first outer cylinder member is in the extended position, and a hydraulic pump assembly supported by the mounting bracket and hydraulically coupled to the cylinder assembly Another aspect of the embodiments disclosed herein may further or alternatively include a modular leveling assembly for a vehicle that includes a mounting bracket configured to couple to a vehicle component, and a hydraulic cylinder assembly including an inner piston rod member having a longitudinally-extending first chamber, wherein the inner piston rod member is configured to be fixed with respect to a vehicle component, a first outer cylinder receiving the inner piston rod member therein, wherein the first outer cylinder is telescopingly moveable with respect to the inner piston rod member between a retracted position and an extended position, wherein the inner piston rod member and the first outer cylinder cooperate to define a second chamber therebetween, and a hydraulic pump assembly operably coupled to the hydraulic cylinder, wherein the hydraulic pump assembly is hydraulically coupled to each of the first chamber and the second chamber.

Yet another aspect of the embodiments disclosed may further or alternatively include a modular leveling assembly for a vehicle that includes a mounting bracket configured to mount to a vehicle component, and a hydraulic cylinder assembly including an inner piston rod member fixed with respect to the mounting bracket, and a first outer cylinder receiving the inner piston rod member therein, wherein the inner piston rod member and the first outer cylinder are telescopingly coupled with one another between a retracted position and an extended position. The modular leveling assembly may further include a hydraulic pump assembly that includes at least one drive motor, a drive gear assembly configured to be driven by the at least one drive motor, and a hydraulic fluid reservoir in fluid communication with the drive gear assembly, wherein the hydraulic pump is hydraulically coupled to the hydraulic cylinder assembly, wherein the pump assembly is configured to be selectively mounted to a proximal end of the mounting bracket between a plurality of radially offset positions about the mounting bracket.

Still yet another aspect of the embodiments disclosed herein may further or alternatively include a modular leveling assembly for a vehicle that includes a mounting bracket configured to mount to a vehicle component, and a hydraulic cylinder assembly that includes an inner piston rod member, and a first outer cylinder receiving the inner piston rod member therein, wherein the inner piston rod member and the first outer cylinder are telescopingly moveable with respect to one another between a retracted position and an extended position. The modular leveling assembly may further include a hydraulic pump assembly hydraulically coupled to the cylinder assembly, the hydraulic pump assembly including a positive displacement pump gear assembly, at least two drive motors, and a drive gear assembly operably coupling the at least two drive motors to the positive displacement pump gear assembly.

Yet another aspect of the embodiments disclosed herein may further or alternatively include a modular leveling assembly for a vehicle that includes a hydraulic cylinder assembly including an inner piston rod member having a longitudinally-extending first chamber, wherein the inner piston is configured to be fixed with respect to a vehicle component, a first outer cylinder receiving the inner piston rod member therein, wherein the first outer cylinder is telescopingly moveable with respect to the inner piston rod member between a retracted position and an extended position, wherein the inner piston rod member and the first outer cylinder cooperate to define a second chamber therebetween, and a second outer cylinder fixed with respect to the inner piston rod and telescopingly receiving the first outer cylinder therein, wherein the first outer cylinder and the second outer cylinder cooperate to define a third chamber therebetween. The modular leveling assembly may further include a hydraulic pump assembly operably coupled to the hydraulic cylinder, wherein the hydraulic pump is hydraulically coupled to each of the first chamber, the second chamber and the third chamber.

Still yet another aspect of the embodiments as disclosed herein may further or alternatively include a modular leveling assembly for a vehicle that includes a mounting bracket configured to mount to a vehicle component, and a hydraulic cylinder assembly including an inner piston rod member fixed with respect to the mounting bracket, and a first outer cylinder receiving the inner piston rod member therein, wherein the inner piston rod member and the first outer cylinder are telescopingly coupled with one another between a retracted position and an extended position. The modular leveling assembly may further include a hydraulic pump assembly that includes at least one drive motor, a pump gear assembly configured to be driven by the at least one drive motor, and a hydraulic fluid reservoir in fluid communication with the pump gear assembly, wherein the hydraulic pump is separate from and hydraulically coupled to the hydraulic cylinder assembly, wherein the fluid reservoir is reconfigurable between an expanded configuration and a collapsed configuration, and wherein the fluid reservoir is void of air.

These and other features, advantages, and objects of the present invention will be further understood and appreciated by those skilled in the art by reference to the following specification, claims, and appended drawings.

BRIEF DESCRIPTION OF THE DRAWINGS

FIG. 11.

DETAILED DESCRIPTION

Figure 1:
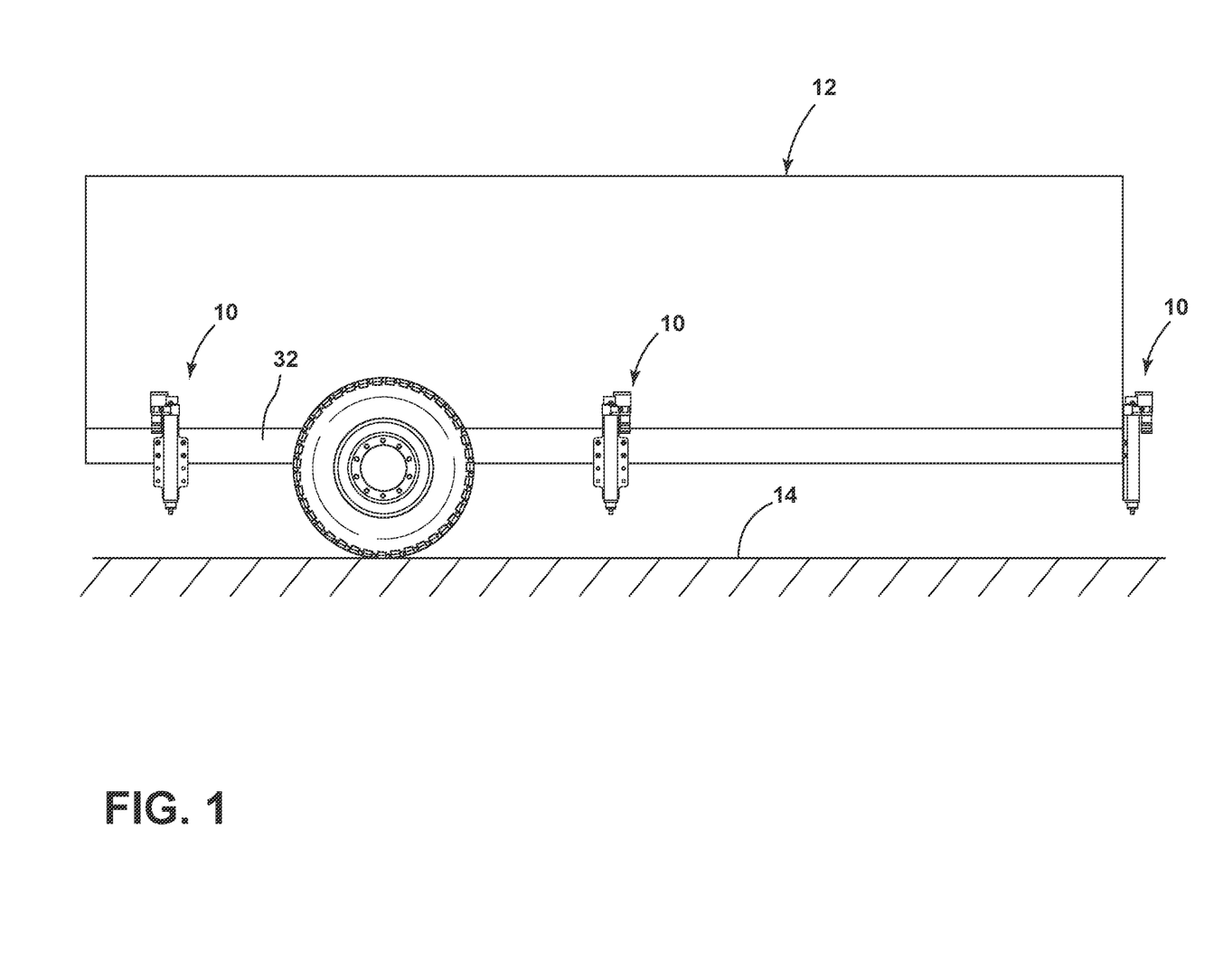
FIG. 1 is a side elevational view of a vehicle, including a trailer assembly, supported above a ground surface by a plurality of modular leveling assemblies.
Figure 2:
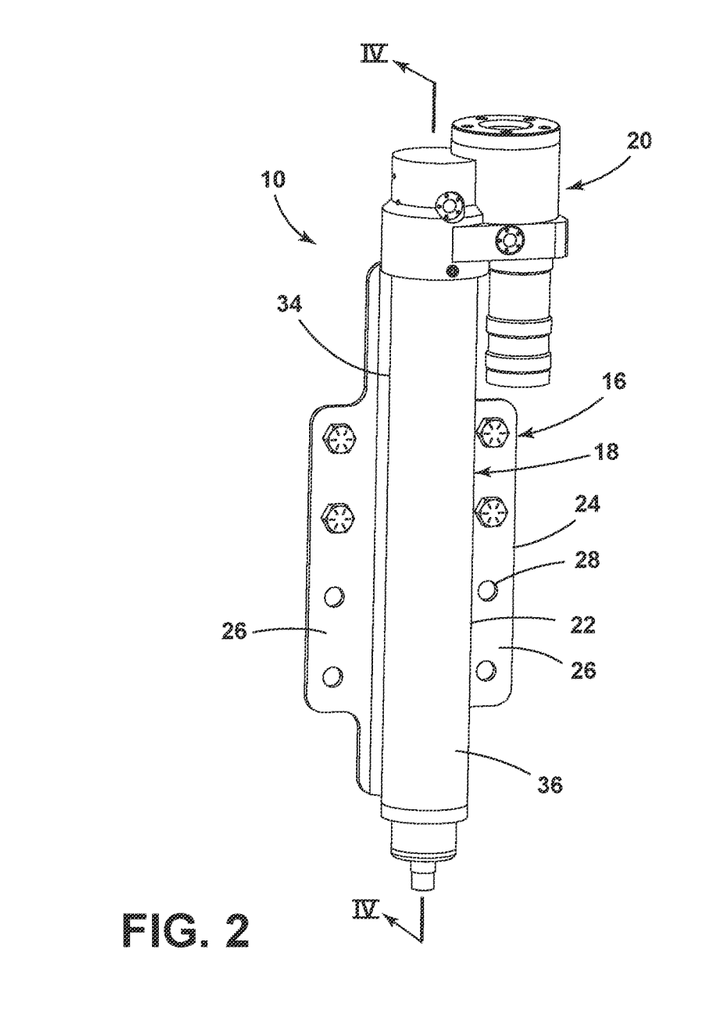
FIG. 2 is a front perspective view of a modular leveling assembly.
Figure 3:
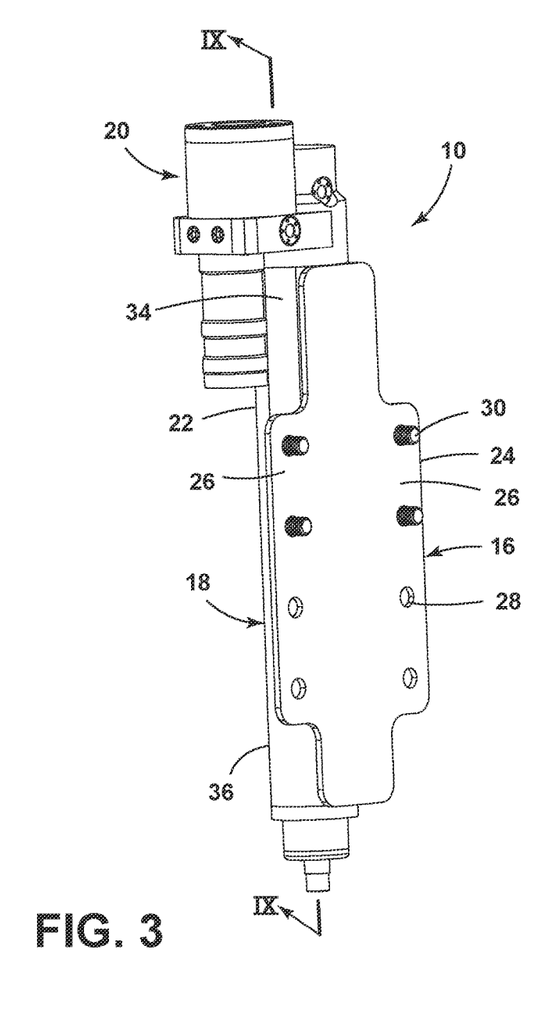
FIG. 3 is a rear perspective view of the modular leveling assembly.

For purposes of description herein, the terms "upper," "lower," right," "left," "rear," "front," "vertical," "horizontal," and derivatives thereof shall relate to the invention as oriented in FIGS. 1-3. However, it is to be understood that the invention may assume various alternative orientations and step sequences, except where expressly specified to the contrary. It is also to be understood that the specific devices and processes illustrated in the attached drawings, and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

Figures 4, 5:
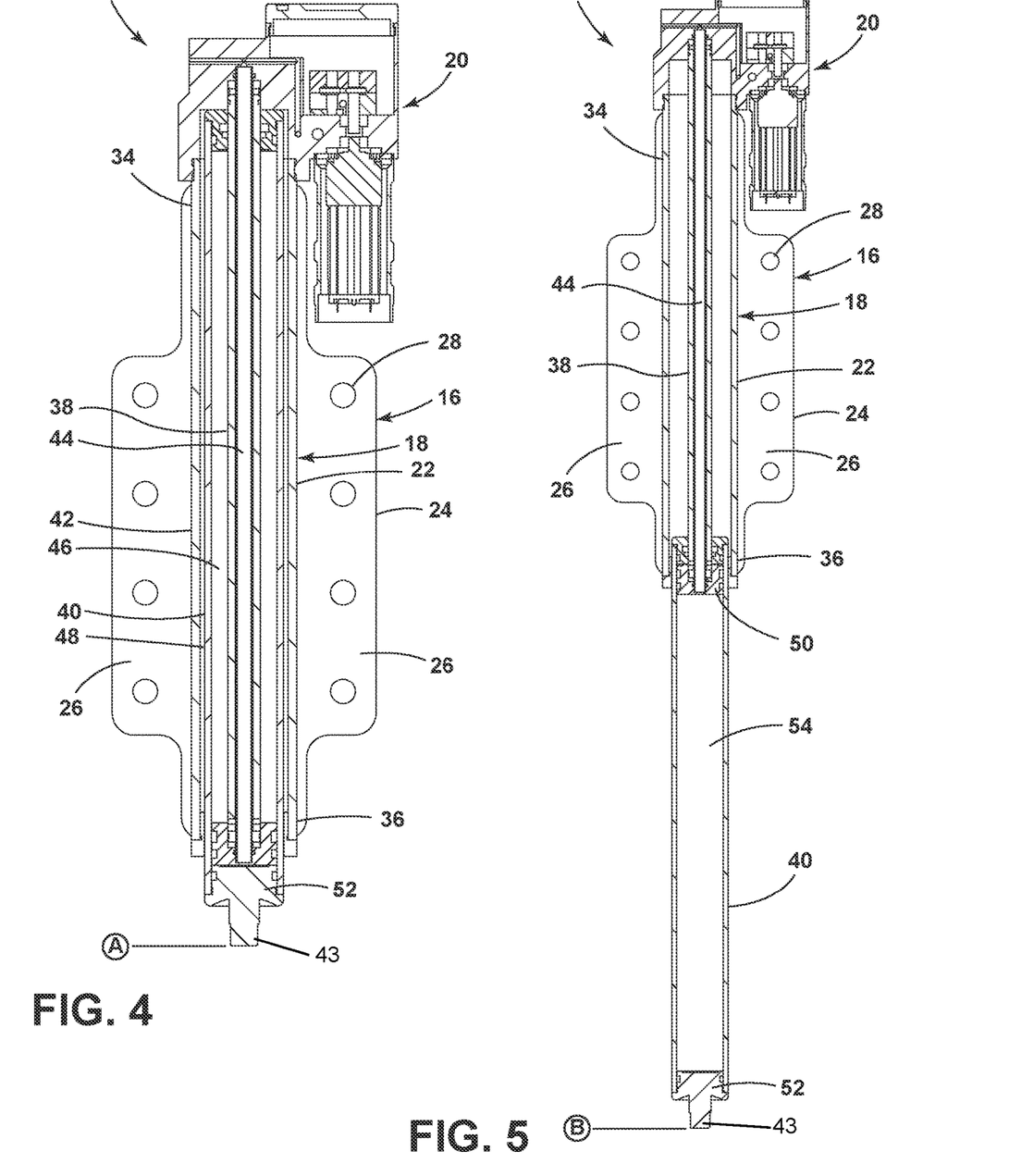
FIG. 4 is a front cross-section elevational view of the modular leveling assembly taken through the line IV-IV, FIG. 2, with the modular leveling assembly in a retracted position.
FIG. 5 is a front cross-section elevational view of the modular leveling assembly shown in an extended position.

The reference numeral 10 (FIGS. 1-3) generally designates a modular leveling assembly, wherein a plurality of modular leveling assemblies may be utilized to support a vehicle, such as a trailer assembly 12 above a ground surface 14. In the illustrated example, the modular leveling assembly 10 includes a mounting bracket 16, a hydraulic cylinder assembly 18, and a hydraulic pump assembly 20, wherein the modular leveling assembly 10 is operable between a retracted position A (FIG. 4) and an extended position B (FIG. 5), as further described below.

In the illustrated example, the mounting bracket 16 includes a body portion 22 integrally formed with a mounting plate 24 that includes a pair of flanges 26 that extend outwardly from the body portion 22 and include a plurality of mounting apertures 28 each configured to receive mounting hardware such as bolts 30 therethrough to mount the modular leveling assembly 10 to a vehicle frame member 32. The body portion 22 of the mounting bracket 16 includes a proximal end 34 and a distal end 36.

Figure 6:
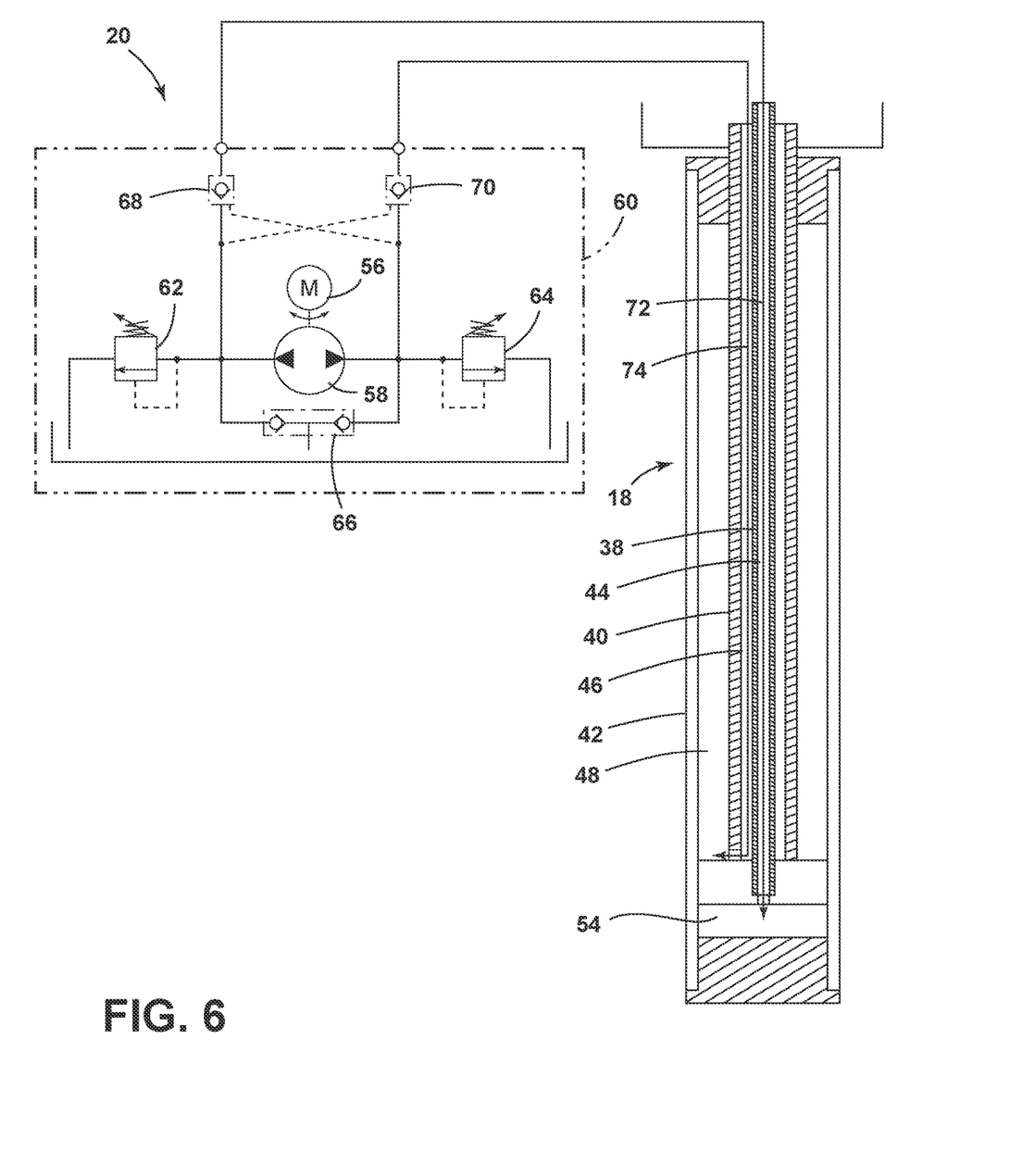
FIG. 6 is a schematic view of a pneumatic circuit of the modular leveling assembly.

The hydraulic cylinder assembly 18 (FIGS. 4 and 5) includes an inner piston rod 38, a first outer cylinder 40 and a second outer cylinder 42, wherein the inner piston rod member 38 and the second outer cylinder 42 are fixed with respect to the mounting bracket 16, and wherein the first outer cylinder 40 is telescopingly movable with respect to the inner piston rod member 38 and the second outer cylinder 42 such that the first outer cylinder 40 is movable between the retracted and extended positions A, B, where a support member 43 coupled to the outer cylinder 40 is configured to abut the ground surface 14 when the outer cylinder is in the extended position B. In the illustrated example, the second outer cylinder 42 is integral with the mounting bracket 16, but may comprise a separate piece from the mounting bracket 18 depending upon the application. The inner piston rod member 38 includes a longitudinally-extending first chamber 44, the inner piston rod member 38 and the first outer cylinder 40 cooperate to define a second chamber 46 therebetween, and the first outer cylinder 40 and the second outer cylinder 42 cooperate to define a third chamber 48 therebetween, where the first chamber 44, the second chamber 46 and the third chamber 48 are in hydraulic communication with the hydraulic pump assembly 20. A first piston 50 is fixedly coupled to a distal end of the inner piston rod member 38 and a second piston 52 is fixedly coupled to a distal end of the first outer cylinder 40, where the first outer cylinder 40, the first piston 50 and the second piston 52 cooperate to define a fourth chamber 54 that is in hydraulic communication with the first chamber 44 and expands as the first outer cylinder 40 is moved from the retracted position A toward the extended position B by receiving hydraulic fluid from the first chamber 44. Specifically, and as best illustrated in FIG. 6, the hydraulic pump assembly 20 includes a two-way hydraulic motor 56, as further described below, where the motor drives a hydraulic pump 58 controlled through a pneumatic circuit 60 that includes first and second normally open, pressure reducing valves 62, 64, a two-way check valve 66 and a pair of check valves 68, 70 pneumatically coupling and controlling the hydraulic fluid provided by the motor assembly 56 and hydraulic pump 58.

In operation, the hydraulic pump assembly 20 actuates the first outer cylinder 40 from the retracted position A toward the extended position B by providing hydraulic fluid pressure in a path 72 through the first chamber 44 and into the fourth chamber 54, and from the extended position B toward the retracted position A by moving fluid from the fourth chamber 54 through the first chamber 44 and into the third chamber 48 via the second chamber 46 along a path 74.

Figure 7:
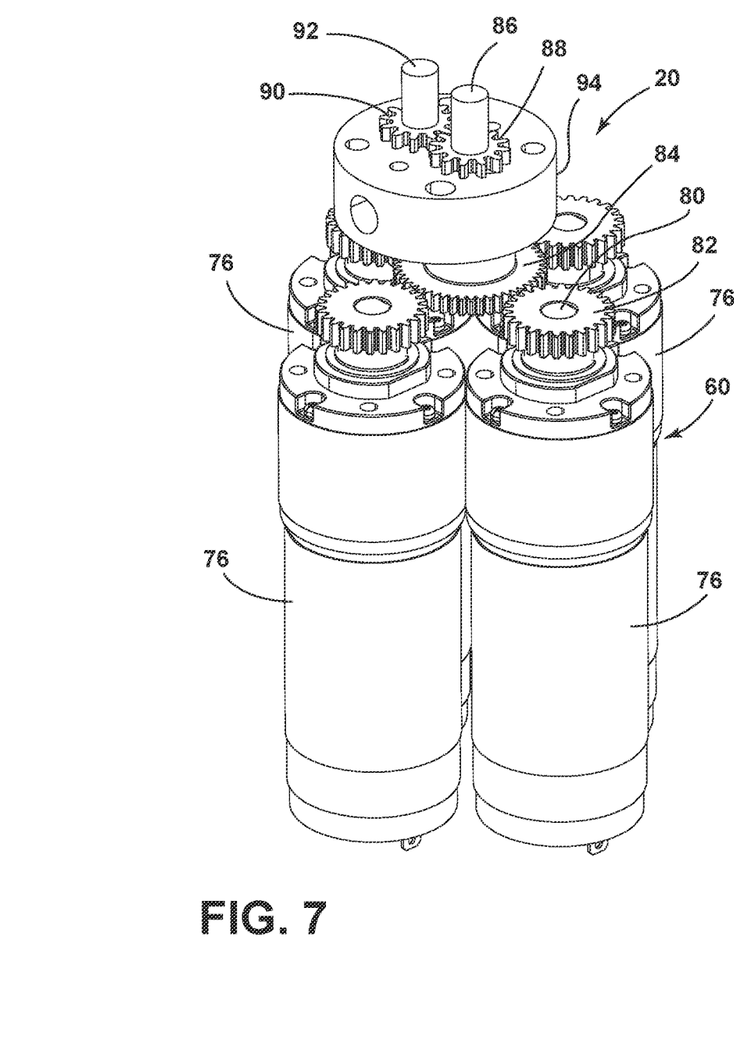
FIG. 7 is a perspective view of a drive motor assembly that includes a plurality of drive motors.
Figure 8:
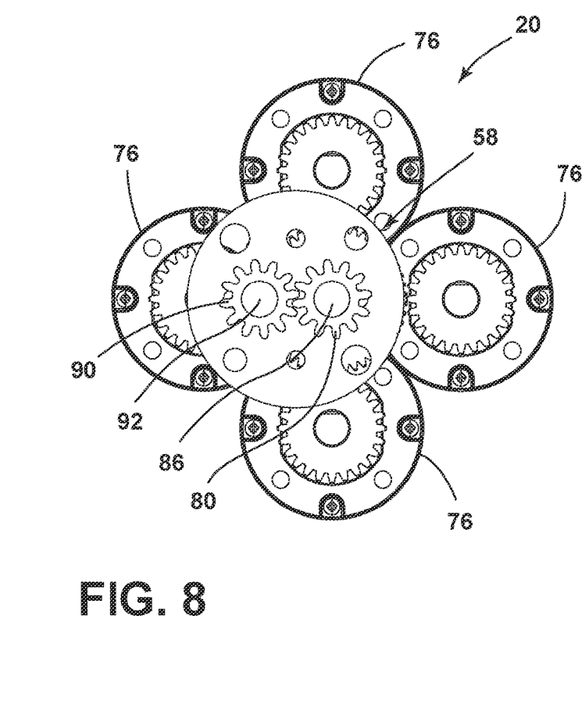
FIG. 8 is a top plan view of the drive motor assembly.

As best illustrated in FIGS. 7 and 8, the hydraulic pump assembly 20 includes the motor assembly 56 and the hydraulic pump 58. In the illustrated example, the motor assembly 56 may include one or more drive motors 76, wherein the drive motors 76 may be separately powered or actuated so as to provide increased power to the hydraulic pump 58 depending upon the specific application. The multi-motor arrangement allows for a standardized modular leveling assembly 10 to be applied or attached to vehicles that have lifting requirements that vary with respect to one another by including additional drive motors 76 as necessary, and may also be utilized in a step-type power arrangement, where the drive motors 76 within a given modular leveling assembly 10 are individually actuated so as to increase or decrease the power supplied to the hydraulic pump 58 as the given modular leveling assembly 10 is actuated between the retracted and extended positions A, B, thereby reducing energy consumption within the overall system. Each drive motor 76 includes a driveshaft 80 and a drive gear 82 fixed for rotation with the driveshaft 80. Each drive gear 82 engages a single receiving gear 84. In the illustrated example, the hydraulic pump 58 includes a positive displacement pump, and specifically a gear-type positive displacement pump, although other types of positive displacement pumps including rotary pumps, screw pumps, rotary vane pumps, lobe pumps, and the like may also be utilized.

As illustrated in FIGS. 7 and 8, the receiving gear 84 is fixed for rotation with a driveshaft 86 of the hydraulic pump 58, a drive gear 88 fixed for rotation with the driveshaft 86, an idler gear 90 engaging the drive gear 86 and fixed for rotation with an idler shaft 92 where the driveshaft 86 and the idler shaft 92 with a hydraulic pump body 94.

Figure 9:
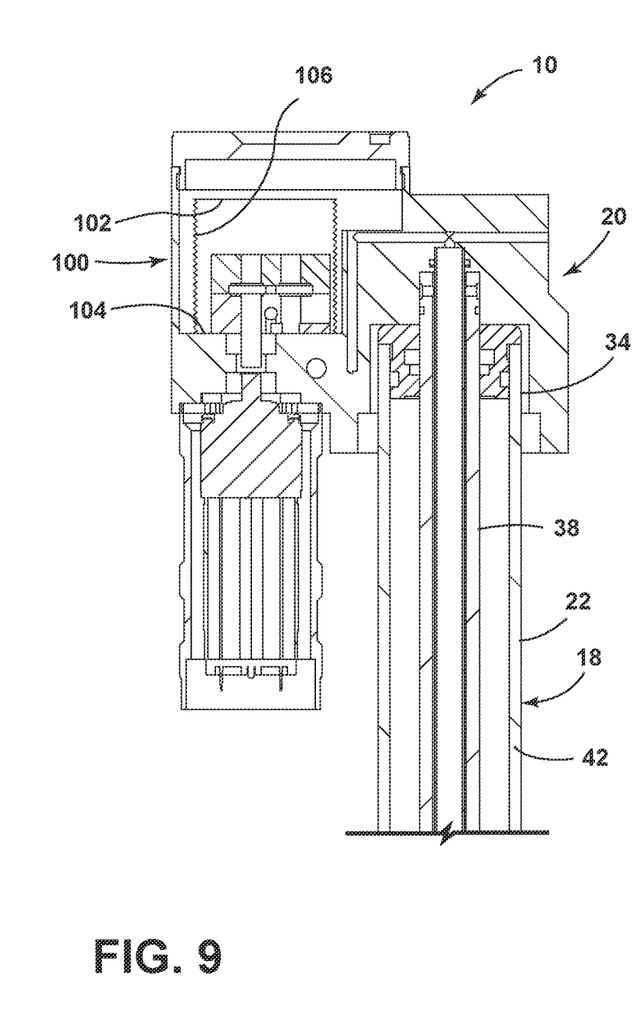
FIG. 9 is a cross-sectional rear elevational view of the modular leveling assembly taken through the line VIII-VIII, FIG. 3.
Figure 10:
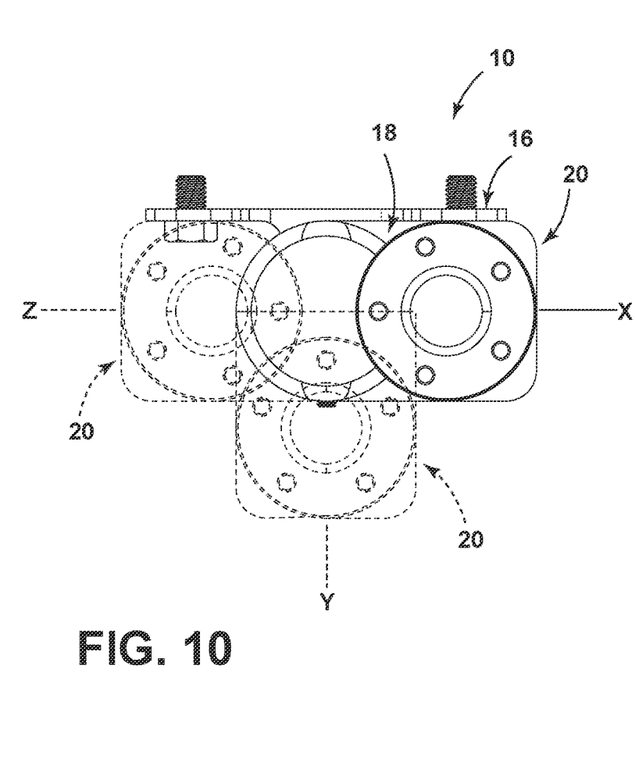
FIG. 10 is a top plan view of the modular leveling assembly illustrating a hydraulic reservoir in a plurality of connection configurations.

The modular leveling assembly 10 may further include a hydraulic reservoir 100 (FIG. 9) that is configured to be attached to the proximal end 34 of the mounting bracket 16 at a plurality of radial positions as best illustrated in FIG. 10, thereby allowing the overall modular leveling assembly 69 to be configured so as to be utilized within vehicles having varying packaging restrictions. In the illustrated example, the hydraulic reservoir 100 includes a first end wall 102, a second end wall 104 and a collapsible side wall 106, where the side wall 106 has an accordion-type configuration. The overall configuration of the hydraulic reservoir 100 allows the reservoir to expand and collapse as fluid is moved between the retracted and extended positions A, B where the first, second, third and fourth chambers 44, 46, 48, 54 and the hydraulic reservoir 100 are void of air.

Figure 11:
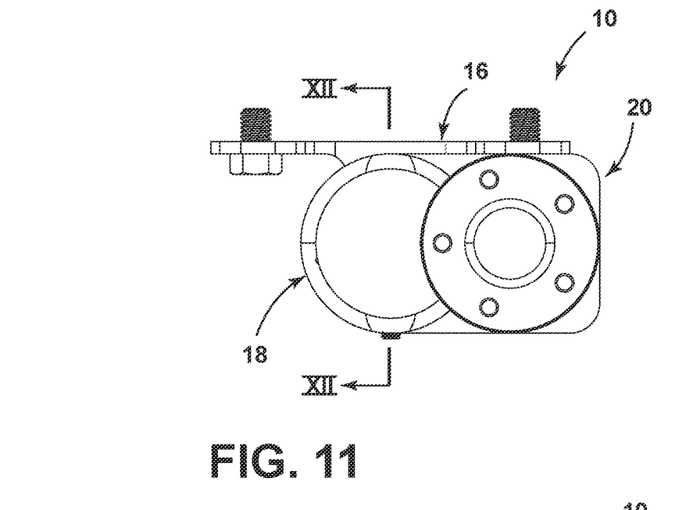
FIG. 11 is a top plan view of the modular leveling assembly.
Figure 12:
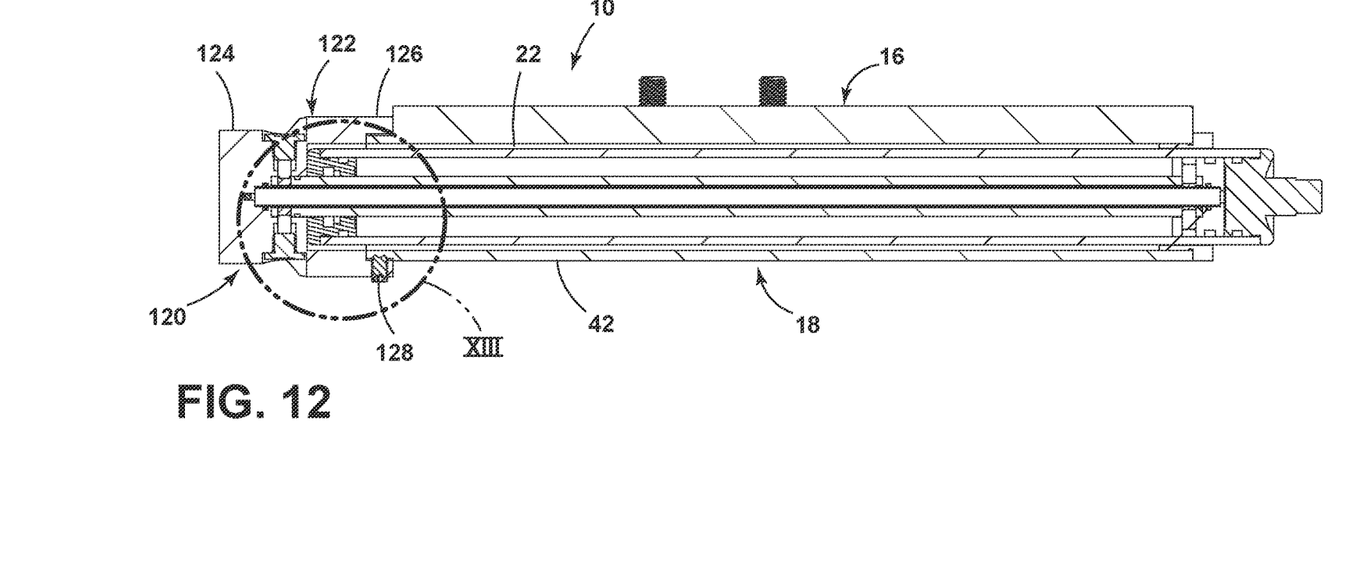
FIG. 12 is a cross-section elevational view of the modular leveling assembly taken along the line XII-XII.
Figure 13:
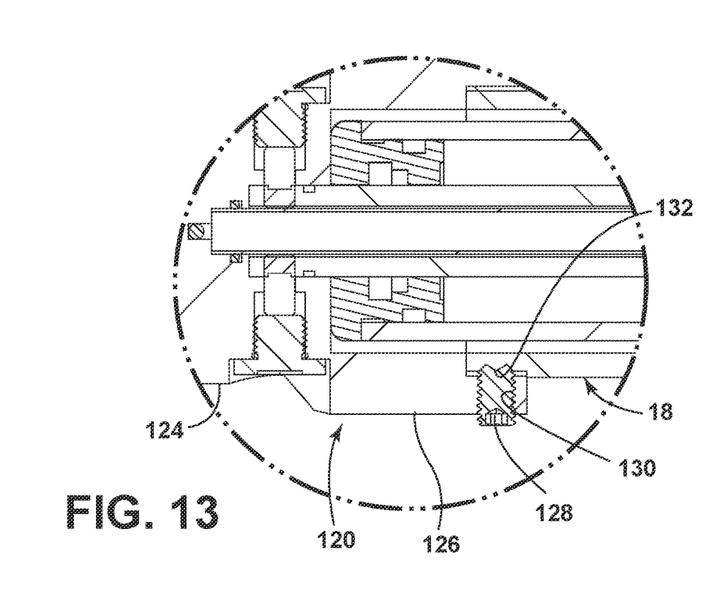
FIG. 13 is an enlarged view of the area XIII, FIG. 12.

The modular leveling assembly 10 (FIG. 10) may also be configured such that the hydraulic pump assembly 20 may be attached to the hydraulic cylinder assembly 18 at varying radial positions, such as a first position X, a second position Y radially offset from the first position X by about 90°, and a third position Z radially offset from the second position Y be about 90°. As best illustrated in FIGS. 11-13, the hydraulic motor assembly 20 is coupled to the mounting bracket 16 and the hydraulic cylinder assembly 18 via a coupling arrangement 120 that includes a collar assembly 122 having a first portion 124 secured to the hydraulic motor assembly 20, and a second portion or collar 126 that receives the proximal end of the hydraulic cylinder assembly 18 therein. The collar 126 is secured to the hydraulic cylinder via locking screws 128 that threadably extend through threaded apertures 130 of the collar 126, and that are received into recesses 132 of the body portion 22/second outer cylinder 42 spaced about a circumference of the body portion 22/second outer cylinder 42. In the illustrated example, the recesses 132 are spaced at 90° intervals from one another corresponding to the first, second and third positions X, Y, Z, although other spacing may be provided depending upon the packing requirements of the particular application.

The modular leveling assembly as shown and described herein may be variously configured thereby allowing the assembly to be utilized within numerous vehicle platforms with varying packaging limitations and overall configurations. The modular leveling assembly is efficient in use, provides reduced overall energy consumption, efficiency during operation, is highly durable, is capable of a long operating life, and is particularly well adapted for the proposed use.

The invention claimed is:

1. A modular leveling assembly for a vehicle, comprising:
 a mounting bracket configured to mount to a vehicle component;
 a hydraulic cylinder assembly, comprising:
  an inner piston rod member fixed with respect to the mounting bracket;
  a first outer cylinder receiving the inner piston rod member therein, wherein the first outer cylinder is telescopingly moveable with respect to the inner piston rod member from a retracted position and an extended position; and
  a second outer cylinder fixed with respect to the mounting bracket and the inner piston rod member, the second outer cylinder telescopingly receiving the first outer cylinder therein, wherein the inner piston rod member defines a first chamber hydraulically coupled to the hydraulic pump assembly, the inner piston rod member and the first outer cylinder cooperate to define a second chamber when the first outer cylinder is in the retracted position, the first outer cylinder and the second outer cylinder cooperate to define a third chamber when the first outer cylinder is in the retracted position, and wherein the first outer cylinder defines a fourth chamber when in the extended position;
 a support member coupled to a distal end of the first outer cylinder and configured to abut a ground surface when the first outer cylinder member is in the extended position; and
 a hydraulic pump assembly supported by the mounting bracket and hydraulically coupled to the hydraulic cylinder assembly;
 wherein the hydraulic cylinder assembly is configured such that a hydraulic fluid passes from the first chamber directly to the fourth chamber as the first outer cylinder moves from the retracted position to the extended position, and such that the hydraulic fluid passes from the fourth chamber through the first chamber and then to the third chamber via the second chamber as the first outer cylinder moves from the extended position to the retracted position.

2. The modular leveling assembly of claim 1, wherein the second outer cylinder and the mounting bracket are integral with one another.

3. The modular leveling assembly of claim 1, the first chamber extends longitudinally along the inner piston rod member.

4. The modular leveling assembly of claim 1, wherein the hydraulic pump assembly comprises a positive displacement pump.

5. The modular leveling assembly of claim 1, wherein the hydraulic pump assembly comprises a rotary pump.

6. The modular leveling assembly of claim 1, wherein the hydraulic pump assembly includes at least one drive motor and a drive gear arrangement.

7. The modular leveling assembly of claim 6, wherein the at least one drive motor includes a plurality of drive motors.

8. The modular leveling assembly of claim 1, wherein the hydraulic pump assembly is configured to be mounted to a proximal end of the mounting bracket between a plurality of radially offset positions.

9. A modular leveling assembly for a vehicle, comprising:
 a mounting bracket configured to couple to a vehicle component;
 a hydraulic cylinder assembly, comprising:
  an inner piston rod member having a longitudinally-extending first chamber, wherein the inner piston rod member is configured to be fixed with respect to the vehicle component;
  a first outer cylinder receiving the inner piston rod member therein, wherein the first outer cylinder is telescopingly moveable with respect to the inner piston rod member between a retracted position and an extended position, wherein the inner piston rod member and the first outer cylinder cooperate to define a second chamber therebetween; and a second outer cylinder fixed with respect to the inner piston rod member and telescopingly receiving the first outer cylinder therein, wherein the first outer cylinder and the second outer cylinder cooperate to define a third chamber therebetween, wherein the hydraulic pump assembly is hydraulically coupled to the third chamber, and wherein the first outer cylinder defines a fourth chamber when in the extended position; and a hydraulic pump assembly supported by the mounting bracket and operably coupled to the hydraulic cylinder assembly, wherein the hydraulic pump assembly is hydraulically coupled to each of the first chamber and the second chamber;

wherein the hydraulic cylinder assembly is configured such that a hydraulic fluid passes from the first chamber directly to the fourth chamber as the first outer cylinder moves from the retracted position to the extended position, and such that the hydraulic fluid passes from the fourth chamber through the first chamber and then to the third chamber via the second chamber as the first outer cylinder moves from the extended position to the retracted position.

10. The modular leveling assembly of claim 9, wherein the mounting bracket and the second outer cylinder are integral with one another.

11. The modular leveling assembly of claim 9, further comprising:

a support member coupled to a distal end of the first outer cylinder and configured to abut a ground surface when the first outer cylinder is in the extended position.

12. The modular leveling assembly of claim 9, wherein the hydraulic pump assembly comprises a positive displacement pump.

13. The modular leveling assembly of claim 9, wherein the hydraulic pump assembly includes at least one drive motor and a drive gear arrangement.

14. The modular leveling assembly of claim 13, wherein the at least one drive motor includes a plurality of drive motors.

15. A modular leveling assembly for a vehicle, comprising:

a mounting bracket configured to mount to a vehicle component;

a hydraulic cylinder assembly, comprising:

an inner piston rod member defining a first chamber; and a first outer cylinder receiving the inner piston rod member therein, wherein the inner piston rod member and the first outer cylinder are telescopingly moveable with respect to one another between a retracted position and an extended position, wherein the inner piston rod member and the first outer cylinder cooperate to define a second chamber when the first outer cylinder is in the retracted position; and a second outer cylinder fixed with respect to the mounting bracket and the inner piston rod member, the second outer cylinder telescopingly receiving the first outer cylinder therein, wherein the first outer cylinder and the second outer cylinder cooperate to define a third chamber when the first outer cylinder is in the retracted position and the first outer cylinder defines a fourth chamber when the first outer cylinder is in the extended position; and a hydraulic pump assembly supported by the mounting bracket and hydraulically coupled to the hydraulic cylinder assembly, the hydraulic pump assembly comprising:

a positive displacement pump gear assembly;

at least two drive motors; and a drive gear assembly operably coupling the at least two drive motors to the positive displacement pump gear assembly;

wherein the hydraulic cylinder assembly is configured such that a hydraulic fluid passes from the first chamber directly to the fourth chamber as the first outer cylinder moves from the retracted position to the extended position, and such that the hydraulic fluid passes from the fourth chamber through the first chamber and then to the third chamber via the second chamber as the first outer cylinder moves from the extended position to the retracted position.

16. The modular leveling assembly of claim 15, wherein the at least two drive motors includes at least four drive motors.

17. The modular leveling assembly of claim 15, wherein each of the at least two drive motors includes a drive shaft and a drive gear fixed for rotation with the drive shaft, and wherein the gear drive assembly includes a receiving gear that engages each of the drive gears.

18. The modular leveling assembly of claim 15, wherein the hydraulic pump assembly comprises a rotary pump.

19. The modular leveling assembly of claim 15, wherein the hydraulic pump assembly further comprises a hydraulic fluid reservoir in fluid communication with a hydraulic pump.

20. The modular leveling assembly of claim 19, wherein the hydraulic fluid reservoir is collapsible.

* * * * *